(12) United States Patent
Pfadler et al.

(10) Patent No.: US 11,900,808 B2
(45) Date of Patent: Feb. 13, 2024

(54) APPARATUS, METHOD, AND COMPUTER PROGRAM FOR A FIRST VEHICLE AND FOR ESTIMATING A POSITION OF A SECOND VEHICLE AT THE FIRST VEHICLE

(71) Applicant: VOLKSWAGEN AKTIENGESELLSCHAFT, Wolfsburg (DE)

(72) Inventors: Andreas Pfadler, Berlin (DE); Bernd Rech, Bokensdorf (DE); Daniel Reimann, Braunschweig (DE); Stefan Gläser, Braunschweig (DE); Bernd Lehmann, Wolfsburg (DE); Julia Kwasny, Wolfsburg (DE)

(73) Assignee: VOLKSWAGEN AKTIENGESELLSCHAFT

( * ) Notice: Subject to any disclaimer, the term of this patent is extended or adjusted under 35 U.S.C. 154(b) by 120 days.

(21) Appl. No.: 17/464,216

(22) Filed: Sep. 1, 2021

(65) Prior Publication Data

US 2022/0076575 A1 Mar. 10, 2022

(30) Foreign Application Priority Data

Sep. 8, 2020 (EP) .................................... 20195053

(51) Int. Cl.
*G08G 1/13* (2006.01)
*H04W 4/46* (2018.01)
(Continued)

(52) U.S. Cl.
CPC .................... *G08G 1/127* (2013.01)

(58) Field of Classification Search
None
See application file for complete search history.

(56) References Cited

U.S. PATENT DOCUMENTS

| 2010/0198513 | A1 | 8/2010 | Zeng et al. |
| 2016/0142491 | A1* | 5/2016 | Engel .................. H04L 67/12 340/902 |

(Continued)

FOREIGN PATENT DOCUMENTS

WO 2018110283 A1 6/2018

OTHER PUBLICATIONS

Atev et al.; Clustering of Vehicle Trajectories; IEEE Transactions on Intelligent Transportation Systems; Sep. 2021; vol. 11, No. 3; pp. 647-657.

(Continued)

*Primary Examiner* — John F Mortell
(74) *Attorney, Agent, or Firm* — Barnes & Thornburg LLP

(57) ABSTRACT

A transportation vehicle, an apparatus, a method, and a computer program for a first transportation vehicle and for estimating a position of a second transportation vehicle at the first transportation vehicle. The method for a first transportation vehicle and for estimating a position of a second transportation vehicle at the first transportation vehicle includes obtaining information on an environmental map of the first transportation vehicle; receiving information on a trajectory of the second transportation vehicle; and estimating the position of the second transportation vehicle in the environmental map based on the information on the trajectory.

26 Claims, 4 Drawing Sheets

(51) Int. Cl.
   *H04W 84/18*   (2009.01)
   *G08G 1/127*   (2006.01)

(56) References Cited

U.S. PATENT DOCUMENTS

| | | |
|---|---|---|
| 2017/0227968 A1 | 8/2017 | Klinger et al. |
| 2017/0278400 A1* | 9/2017 | Ferguson ............ G01C 21/3848 |
| 2018/0075745 A1* | 3/2018 | Buburuzan ............ G08G 1/162 |
| 2018/0321689 A1* | 11/2018 | Lehmann ............... G08G 1/163 |
| 2019/0251848 A1* | 8/2019 | Sivanesan ............... H04W 4/46 |
| 2019/0295418 A1 | 9/2019 | Akamine et al. |
| 2022/0028263 A1* | 1/2022 | Ashour .................... H04Q 9/00 |

OTHER PUBLICATIONS

Search Report for European Patent Application No. 20195053.2; dated Feb. 19, 2021.

* cited by examiner (a) Scene 1 - 403 trajectories, 38(9.4%) outliers (b) Scene 2 - 391 trajectories, 6(1.5%) outliers

APPARATUS, METHOD, AND COMPUTER PROGRAM FOR A FIRST VEHICLE AND FOR ESTIMATING A POSITION OF A SECOND VEHICLE AT THE FIRST VEHICLE

PRIORITY CLAIM

This patent application claims priority to European Patent Application No. 20195053.2, filed 8 Sep. 2020, the disclosure of which is incorporated herein by reference in its entirety.

SUMMARY

Illustrative embodiments relate to a transportation vehicle, an apparatus, a method, and a computer program for a first transportation vehicle and for estimating a position of a second transportation vehicle at the first transportation vehicle, more particularly, but not exclusively, to a concept for a transportation vehicle, which allows estimating positions of other transportation vehicles in the environment based on trajectory information of the other transportation vehicles.

BRIEF DESCRIPTION OF THE DRAWINGS

Disclosed embodiments are described with reference to the accompanying figures, in which.

DETAILED DESCRIPTION

Figure 1:
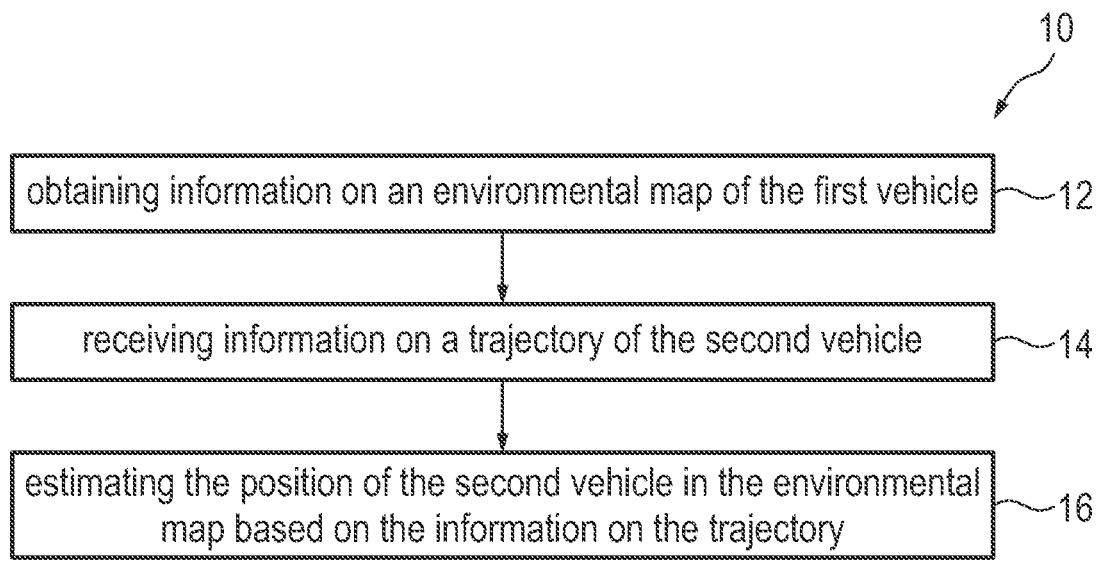
FIG. 1 illustrates a block diagram of an exemplary embodiment of a method for a first transportation vehicle and for estimating a position of a second transportation vehicle at the first transportation vehicle.

Direct communication between mobile devices, also referred to as device-to-device (D2D), vehicle-to-vehicle (V2V), or car-to-car communication (C2C), has been a feature under development of newer generations of mobile communication systems. By enabling direct communication between transportation vehicles, message exchange can be enabled at low latencies. These messages can be used to share information among road participants. For example, transportation vehicles can share certain parameters and environmental information to improve individual environmental models and mutual awareness. In automated or autonomous driving transportation vehicles need to continuously monitor and develop information on their environment and surroundings. Message exchange with other transportation vehicles and traffic infrastructure can contribute to the development of such an environmental model.

Document US 2010/0198513 A1 describes a concept for monitoring remote transportation vehicles relative to a host transportation vehicle through generating a sensor object data map in response to sensed objects, generating a vehicle-to-vehicle object data map, merging both maps, and estimating a relative position of the remote transportation vehicles using the merged maps.

Document US 2017/0227968 A1 describes an unmanned transportation vehicle for use with a companion unmanned transportation vehicle. The unmanned transportation vehicle includes a location unit that is configured to determine a current position of the unmanned transportation vehicle. The unmanned transportation vehicle includes a path planning unit that generates a planned path. The unmanned transportation vehicle receives a planned path of the companion unmanned transportation vehicle and a current position of the companion unmanned transportation vehicle. The unmanned transportation vehicle includes a position unit that is configured to determine a relative position between the unmanned transportation vehicle and the companion unmanned transportation vehicle based on at least the planned paths and the current positions of the unmanned transportation vehicle and the companion unmanned transportation vehicle. The unmanned transportation vehicle also includes a control unit that is configured to control a movement of the unmanned transportation vehicle based on at least the relative position between the unmanned transportation vehicle and the companion unmanned transportation vehicle.

Document WO 2018/110283 A1 discloses a driving assistance device, which comprises another transportation vehicle detection unit, a classification recognition unit, a trajectory acquisition unit, an interference determination unit, and a driving assistance unit. The other transportation vehicle detection unit is configured so that the position of the other transportation vehicle existing in the periphery of the host transportation vehicle is detected. The classification recognition unit is configured so that the traffic classification in which the other transportation vehicle is positioned is recognized. The trajectory acquisition unit is configured so that the host transportation vehicle trajectory representing the future trajectory of the host transportation vehicle is acquired. The interference determination unit is configured so that a determination is made of whether the other transportation vehicle's course representing the course when the other transportation vehicle is travelling in accordance with the traffic classification will interfere with the host transportation vehicle trajectory. The driving assistance unit is configured so that different driving assistance is performed in an interference state representing a case when the other transportation vehicle's course and the host transportation vehicle trajectory interfere, and in a non-interference state representing a case when there is no interference of the other transportation vehicle's course and the host transportation vehicle trajectory.

Known concepts make use of other transportation vehicle's positions, which might not be accurate. An accuracy of the other transportation vehicle's position may be determined by the localization concept used to determine the position. One common positioning method is provided by the global positioning system (GPS), which allows an accuracy of about 10 m. The remaining uncertainty about a position can also lead to ambiguities, e.g., if multiple transportation vehicles a located close to each other.

There is a demand for an improved concept for a first transportation vehicle to determine a position of a second transportation vehicle. This demand is addressed by the disclosed embodiments.

Disclosed embodiments are based on the finding that information on trajectories of transportation vehicles can also be communicated via a radio channel and exploited for localization or positioning. For example, a set of trajectories can be orientated with a relative distance to a transmitting node, e.g., a transportation vehicle, and not with absolute coordination. A set of trajectories can be seen as a trajectory area, e.g., a spatial area, which fits in an environmental map. The information on the trajectories can be used to determine the position of a transportation vehicle in the environmental map, e.g., a high definition (HD) map.

Disclosed embodiments provide a method for a first transportation vehicle and for estimating a position of a second transportation vehicle at the first transportation vehicle. The method comprises obtaining information on an environmental map of the first transportation vehicle and receiving information on a trajectory of the second transportation vehicle. The method further comprises estimating the position of the second transportation vehicle in the environmental map based on the information on the trajectory. Using the information on the trajectories may enable a higher accuracy of a position estimated for the second transportation vehicle.

For example, the information on the trajectory is received from the second transportation vehicle. If information on the trajectory is communicated between the transportation vehicles, the process of an overall mutual positioning can be efficiently improved.

The information on the trajectory may comprise information on a planned route of the second transportation vehicle and information on a desired trajectory of the second transportation vehicle. Such information may further improve the positioning process at the first transportation vehicle as a plausibility consideration can be applied based on the environmental map.

The method may further comprise receiving information on the dimensions of the second transportation vehicle and estimating the position of the second transportation vehicle in the environmental map further based on the information on the dimensions of the second transportation vehicle. Taking the dimensions of the second transportation vehicle into account may further improve the positioning accuracy.

In some exemplary embodiments the method may further comprise receiving information on an estimated location of the second transportation vehicle and estimating the position of the second transportation vehicle in the environmental map further based on the information on the estimated location of the second transportation vehicle. The location estimated by the second transportation vehicle together with the information on its trajectory may further contribute to improving the accuracy of the positioning of the second transportation vehicle.

Moreover, the method may include an optional refining of the estimation of the position of the second transportation vehicle based on logical considerations regarding movements or locations of one or more objects in environmental map. Predetermined objects in the environmental map, e.g., buildings, road structure or other road users, may allow further refinement of the position of the second transportation vehicle.

For example, the logical considerations may comprise evaluating against a predetermined street map. A position of the second transportation vehicle can be evaluated against a street map, e.g., a plausibility check can be conducted on whether the speed of the second transportation vehicle and its position match an according lane of the road.

The estimating may be further based on messages communicated with other transportation vehicles or infrastructure in the environment. For example, other road participants may have determined a position for the second transportation vehicle and their position may further improve the accuracy.

The environmental map may be based on a high-density street map, objects detected using sensor data of the first transportation vehicle, and messages with environmental content received from other transportation vehicles in the environment of the first transportation vehicle. The environmental map may hence comprise a plurality of objects, which can be based on information from independent sources, thereby enhancing reliability of the estimated objects' properties.

For example, the estimating comprises determining a confidence area for the second transportation vehicle in the environmental map. Using a confidence area may provide an efficient measure or way to develop an accuracy for the position of the second transportation vehicle, as any further information can influence (ideally improve) the confidence.

In some exemplary embodiments the method further comprises refining the confidence area based on an actual road and/or traffic situation in the environment of the first transportation vehicle. Information on an actual scene or situation may be considered to further improve a positioning accuracy.

For example, the receiving comprises receiving the information on a trajectory of the second transportation vehicle in a collective perception message (CPM) or a maneuver coordination message (MCM) from the second transportation vehicle. Using these messages may enable an easy implementation of a communication concept for the information on the trajectories in car-to-car (C2C) or vehicle-to-vehicle (V2V) communication.

Disclosed embodiments also provide an apparatus for a first transportation vehicle and for estimating a position of a second transportation vehicle at the first transportation vehicle. The apparatus comprises one or more interfaces configured to communicate messages and a control module, which is configured to control the one or more interfaces. The control module is further configured to perform one of the methods described herein. Another disclosed embodiment is a transportation vehicle comprising an exemplary embodiment of the apparatus.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for a first transportation vehicle and for estimating a position of a second transportation vehicle at the first transportation vehicle. The method 10 comprises obtaining 12 information on an environmental map of the first transportation vehicle. For example, an environmental map may be generated based on sensor data of the first transportation vehicle. Such sensor data may comprise visual or video data, radar data, lidar (light detection and ranging) data, etc. The sensor data may be complemented by data received from other road participants or traffic infrastructure. There are multiple sources for environmental information available at a transportation vehicle. A source are the transportation vehicle's sensors, which sense the environment. Based on the sensor data an environmental map can be determined. An improved environmental map can be generated by merging information from different sources. With the introduction of message exchange between transportation vehicles or traffic participants, the message content can be used to determine an environmental map. The messages from the traffic participants form a source for information on the environment.

As further shown in FIG. 1 the method 10 comprises receiving 14 information on a trajectory of the second transportation vehicle. Such information may be received directly from the second transportation vehicle or from another source, e.g., traffic infrastructure or any data server. The method 10 further comprises estimating 16 the position of the second transportation vehicle in the environmental map based on the information on the trajectory.

Figure 2:
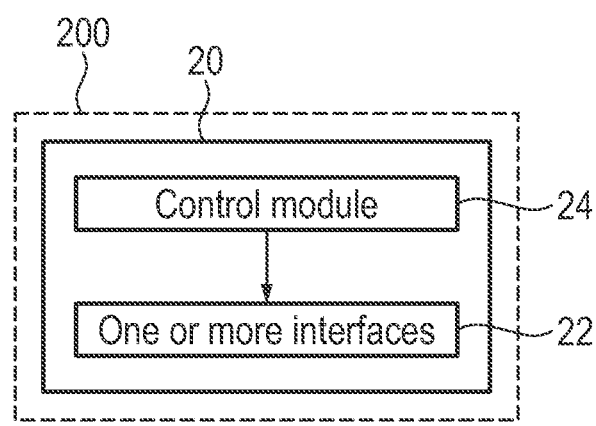
FIG. 2 illustrates block diagrams of exemplary embodiments of an apparatus for a transportation vehicle and a transportation vehicle.

FIG. 2 illustrates block diagrams of exemplary embodiments of an apparatus 20 for a transportation vehicle 200 and a transportation vehicle 200. The apparatus 20 for a first transportation vehicle 200 and for estimating a position of a second transportation vehicle at the first transportation vehicle 200 comprises one or more interfaces 22, which are configured to communicate message, e.g., with the second transportation vehicle. The apparatus 20 further comprises a control module 24, which is coupled to the one or more interfaces 22, and which is configured to control the one or more interfaces 22. The control module 24 is further configured to perform one of the methods 10 described herein. Another exemplary embodiment is a transportation vehicle 200 comprising an exemplary embodiment of the apparatus 20 (shown in broken lines in FIG. 2 as being optional from the perspective of the apparatus 20).

In exemplary embodiments, the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication, e.g., in a mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information related to capabilities, control information, payload information, application requirements, trigger indications, requests, messages, data packets, acknowledgement packets/messages, etc.

As shown in FIG. 2 the one or more interfaces 22 are coupled to the respective control module 24 at the apparatuses 20. In exemplary embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general purpose processor, a Digital Signal Processor (DSP), a micro-controller, etc.

In exemplary embodiments, communication, i.e., transmission, reception or both, may take place among transportation vehicles directly and/or between mobile transceivers/vehicles and a network component/entity (infrastructure or mobile transceiver, e.g., a base station, a network server, a backend server, etc.). Such communication may make use of a mobile communication system. Such communication may be carried out directly, e.g., by using device-to-device (D2D) communication, which may also comprise vehicle-to-vehicle (V2V) or car-to-car (C2C) communication in case of transportation vehicles, and which may be carried out using the specifications of a mobile communication system.

In exemplary embodiments the one or more interfaces 22 can be configured to wirelessly communicate in the mobile communication system. For example, direct cellular vehicle-to-anything (C-V2X), where V2X includes at least V2V, V2-Infrastructure (V2I), V2-Pedestrian (V2P), etc., transmission according to 3GPP Release 14 onward can be managed by infrastructure (so-called mode 3 in LTE) or run in a UE (so-called mode 4 in LTE).

User equipment (UEs)/vehicles may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, dedicated short range communication (DSRC), respectively. Technologies enabling such D2D-communication include 802.11p and beyond, 3GPP (Third Generation Partnership Project) system (4G (4th Generation), 5G (5th Generation), NR (New Radio) and beyond), etc. For example, transportation vehicles exchange certain messages, for example, Cooperative Awareness Messages (CAM) or Decentralized Environment Notification Messages (DENM), etc. The content of such messages may enable recipients to become aware of their environment and determine the first environmental map.

An environmental model may be a digital model of the environment of the transportation vehicle, which can be based on sensor data or on exchanged messages. For example, a transportation vehicle can be equipped with multiple sensors, such as visual/optical (camera), radar, ultrasonic, lidar (light detection and ranging) etc. A transportation vehicle may model its surroundings using this sensor data. At least in some exemplary embodiments such a model may be based on known static data, e.g., as map data comprising a course of one or more roads, intersections, traffic infrastructure (lights, signs, crossings, etc.), buildings, etc. Such a basic layer for the environmental model may be complemented by dynamic or moving objects detected through sensor data. Such a sensor data-based environmental model may form the basis for the second environmental map.

An environmental map may comprise static and dynamic objects in the environment of the transportation vehicle/traffic entity along at least a part of the transportation vehicle's trajectory. Such a part of the trajectory may be, for example, the part the transportation vehicle is planning to travel in the next 30 s, 1 minute, 5 minutes, 10 minutes, etc. A dynamic object is one that is not permanently static/fixed such as other road participants, pedestrians, transportation vehicles, but also semi-static objects such as components of a moving construction side, traffic signs for road or lane narrowing, etc. For example, such dynamic objects may be other transportation vehicles, pedestrians, bicycles, road participants, etc. When determining the environmental model not all objects in the model may be determined with the same confidence. There are objects for which a higher certainty can be achieved than for others. For example, if multiple sensors can identify or confirm a certain object its presence and/or state of movement can potentially be determined with a higher confidence compared to a case in which only data from a single sensor is indicative of an object. Similar considerations apply with respect to a message-based map. If there is an object in the environment multiple traffic participants report on, a higher confidence results as compared to the case in which only a single road participant reports on the object.

For example, transportation vehicles may share their trajectories and other parameters such as current speed, acceleration, etc., to enable cooperative driving. The following trajectory formats may be distinguished:
  I. path history of transportation vehicles obtained by recording the received cooperative awareness messages (CAM) messages,
  II. path history of objects observed and shared by a transportation vehicle and recorded from the received collective perception message (CPM) messages, and
  III. planned and desired trajectories are the future paths the transportation vehicles plan and desire to drive, respectively, and it is shared through a Maneuver Coordination Message (MCM) message.

In exemplary embodiments the information on the trajectory may be received from the second transportation vehicle. For example, one of the above messages may be used, e.g., the receiving comprises receiving the information on the trajectory of the second transportation vehicle in a collective perception message or in a maneuver coordination message from the second transportation vehicle.

According to the above point III the information on the trajectory may comprise information on a planned route of the second transportation vehicle and information on a desired trajectory of the second transportation vehicle. In this case, a trajectory depicts the planned or desired future path mostly expressed as a spatial-temporal description of maneuvers, e.g., 10 sec. Note, that V2X messages might not be received in case of parked transportation vehicles. When they start their journey, there might not be any information about their driving history that can be used to estimate more exact information about their position and heading. In such situation only planned and desired trajectories from MCM may be used for this purpose.

Figure 3A:
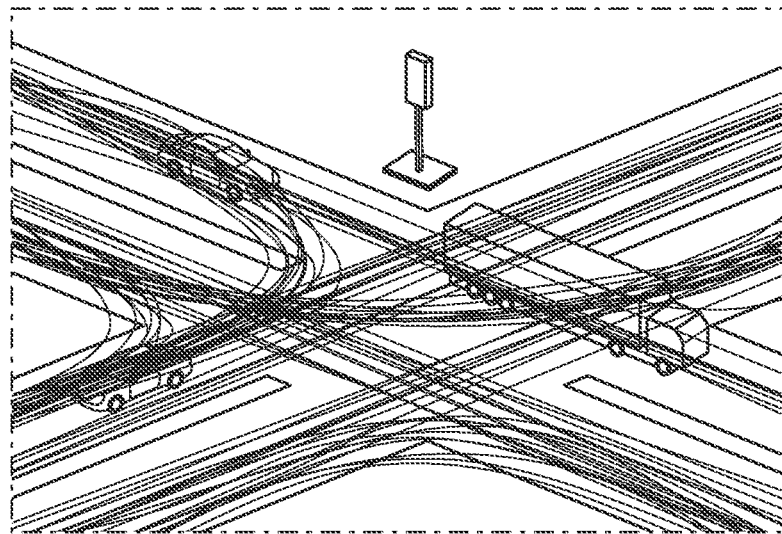
FIGS. 3A and 3B depict example trajectories in an exemplary embodiment.
Figure 3B:
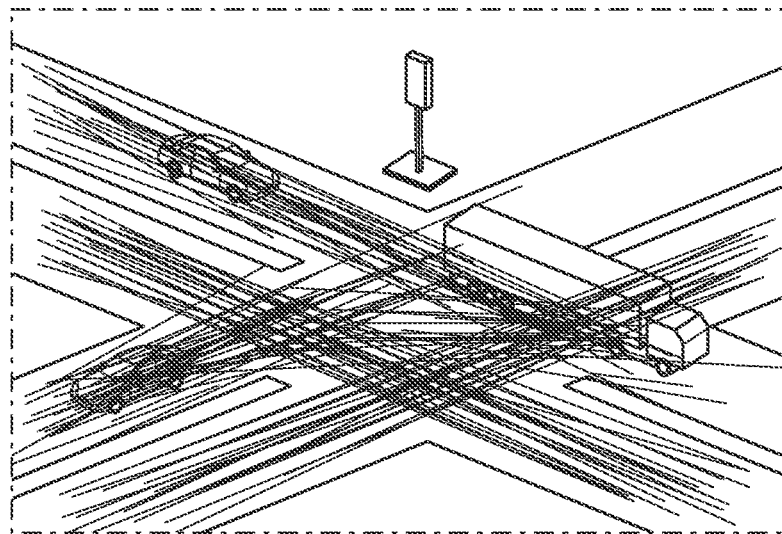

FIG. 3 shows an example of trajectories from different transportation vehicles on which further details can be found in S. Atev, G. Miller and N. P. Papanikolopoulos, "Clustering of Vehicle Trajectories," in IEEE Transactions on Intelligent Transportation Systems, vol. 11, no. 3, pp. 647-657, September 2010. FIG. 3 illustrates two traffic scenes at intersections with different trajectories.

Note, that all possible trajectories of the transportation vehicle are shown but not all of these trajectories are shared via radio link. In fact, only one trajectory (planed trajectory) and optional a second so called desired trajectory for maneuver negotiation is sent within the communication message as for e.g., maneuver coordination message (MCM). It is conceivable that not only one planed trajectory is sent as an example but a description of an area of possible trajectories. Furthermore, transportation vehicles will be equipped with high definition (HD) maps, which are highly accurate.

Figure 4:
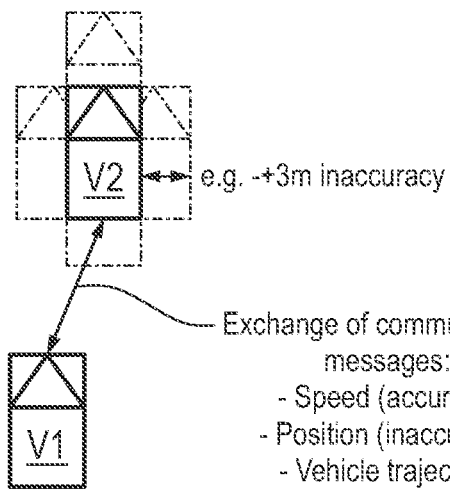
FIG. 4 illustrates an example for positioning and association problems in exemplary embodiments.
Figure 4:
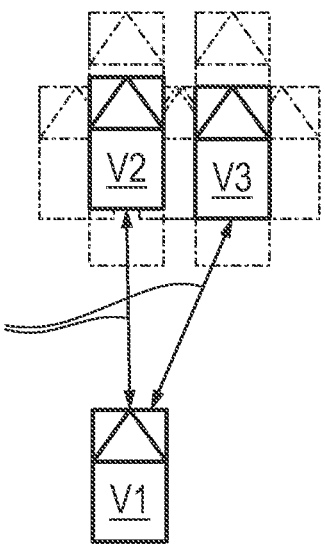

FIG. 4 illustrates an example for positioning and association problems in exemplary embodiments. FIG. 4 shows two scenarios, a scenario with two transportation vehicles V1 and V2 on the left and another scenario with three transportation vehicles V1, V2, and V3 on the right. First, focus is on the inaccuracy of the absolute positioning of a transportation vehicle itself, e.g., using a GPS signal. Transportation vehicle 1 (V1) receives a message with the position of transportation vehicle 2 (V2) which is inaccurate due to the uncertainty of the GPS signal. In this disclosed embodiment, the method 10 comprises receiving information on an estimated location of the second transportation vehicle and estimating the position of the second transportation vehicle in the environmental map further based on the information on the estimated location of the second transportation vehicle. Because of the inaccuracy V1 is not sure where V2 is exactly located. This is illustrated on the left-hand side of FIG. 4, where the inaccuracy is +/−3 m. Second, if V1 receives a message from two cars driving close by, i.e., V2 and V3, ambiguities may result, as shown on the right-hand side of FIG. 4. V1 has difficulties to associate each message to the corresponding transportation vehicle. Is V3 the left or the right transportation vehicle?

In exemplary embodiments one or more trajectories are also received via the radio channel. The set of trajectories are usually orientated with relative distance to the transmitting node, e.g., V2, and not with absolute coordination. The set of trajectories can be seen as trajectory area. A spatial area which fits in a high definition (HD) map. However, the absolute position of the transportation vehicle may also be shared via the radio channel. V1 is trying to find a reasonable location of V2 in its own HD map. The assumption is, that V2 only shares drivable and reasonable trajectories. Therefore, V1 uses the trajectory set of V2 and obtains possible absolute position/s for V2.

The environmental map may be based on a high-density street map, objects detected using sensor data of the first transportation vehicle, and messages with environmental content received from other transportation vehicles in the environment of the first transportation vehicle.

The idea of fitting V2X messages to a map is can be summarized as follows:

Objects detected by transportation vehicle sensors or fixed sensors and V2X objects can be associated. The assignment of V2X messages or the sending transportation vehicles to the transportation vehicles detected with the environment perception of a transportation vehicle or a stationary sensor unit is usually very difficult and often even impossible. The reason is that V2X vehicles which determine/estimate their ego position with GNSS (global navigation satellite system) very often send their ego pose so inaccurately that an association does not succeed.

In exemplary embodiments the following operations may be carried out:
 Recording of traces of V2X messages,
 Assignment on a map (V2X environment map),
 Improvement of the allocation to lanes and locations based on logical connections,
 Recording the traces of objects observed with the transportation vehicle sensors,
 Assignment on a map (object-environment map),
 High-level fusion of the detected transportation vehicles in the map, and
 Assessment of the correlation of the traces.

V2X vehicles send status messages cyclically, in the European standard the so-called Cooperative Awareness Messages (CAM) or in the US standard the Basic Safety Messages (BSM). These contain the transmission positions estimated by the localization system and an indication of their accuracy, which is displayed as an ellipse (confidence ellipse). This is a distribution of the probability with which the true position lies within the ellipse. Furthermore, the history of the last sent positions is given, the path history (limited to a maximum distance of e.g., 300 m or 40 positions). The transmission rate of the CAM/BSM depends on the driving dynamics and is between 2 Hz and 10 Hz. The path history is transmitted at 2 Hz. For privacy reasons, V2X messages contain a pseudonym, which is changed cyclically, e.g., after 15 minutes. In this case, the old path history is deleted and the creation of a new path history is started. Event-messages (Decentralized Environmental Notification Message, DENM) also contain a history of the last sent items. It can be assumed that new, future V2X messages will also send position information.

Ego-localization of transportation vehicles is typically done by using GNSS systems (e.g., GPS) using transportation vehicle odometry. Here the accuracy is in the meter range and can increase to several 10 meters in urban environments if the view of the satellites is lost (urban canyons). For this reason, automatically moving transportation vehicles normally (additionally) use other principles for their ego-localization, such as landmark based localization, which achieves accuracy in the decimeter range. It can be assumed that, at least for the first generations of V2X vehicles, GNSS-based ego-localization will be used essentially.

CAM/BSM also contain other information such as transportation vehicle speed and direction of movement, the status of the indicators and the transportation vehicle class. Emergency vehicles also send information when they are driving with special rights of way or when they are securing a danger zone.

In exemplary embodiments, information about the transportation vehicle location (ego-localization), the localization accuracy, the direction of movement, the path history, the transportation vehicle dynamics and additional information such as the transportation vehicle class and emergency vehicle with special right of way may be processed.

Often several sensor systems are used to detect objects in the vicinity of a transportation vehicle, e.g., camera, lidar and radar. During the determination of the objects, the information of the individual sensor systems is merged. This can be done at the object level (high-level fusion), whereby the objects are first determined individually by the sensor systems and then a fusion takes place. However, a fusion can also take place at the sensor data level (low-level fusion). Here the sensor data is first fused and then the objects are determined.

In some exemplary embodiments, the estimating 16 is further based on messages communicated with other transportation vehicles or infrastructure in the environment.

At least in some exemplary embodiments, a kind of high-level fusion is to take place, in which the V2X vehicles are assigned to the detected transportation vehicles. For examples, embodiments may assume that the recipient transportation vehicle has the following minimum equipment.
 V2X receiver unit,
 Digital map,
 System for ego-localization,
 Sensor system for object detection, and
 Calculation unit for calculating an environment model and for associating V2X vehicles.

In some exemplary embodiments, the estimating 16 comprises determining a confidence area for the second transportation vehicle in the environmental map. The method 10 may further comprise refining the confidence area based on an actual road and/or traffic situation in the environment of the first transportation vehicle.

The following operations may be taken to improve association and for creating a V2X environment map:

1. The positions, confidence ellipses and path history received with the V2X messages are stored in a V2X environment table. Order criteria are the sender pseudonyms and the transmission time. This creates a history of the route for each transmitter.

2. The information on vehicle dynamics (e.g., speed, direction of movement, steering angle) sent with the locations as well as other information such as indicators and light status and special information from emergency vehicles are assigned to the positions.

3. The V2X environment table is updated cyclically. It is limited to a time period to be defined, e.g., the last 30 seconds. In the sense of a ring buffer, the obsolete information is overwritten by new information.

4. The contents of the V2X environment table are entered into a digital map. The confidence ellipses result in confidence tubes for each transmitter for the distances covered. These have a possibly fluctuating width if the confidence ellipse has changed during the observation period.

5. Each confidence tube contains the trajectory resulting from the individual associated transmitted positions. This is congruent with the points of the path history. In the event that individual V2X messages were not received, the missing positions are added from the path history and the corresponding part of the confidence tube, e.g., they are estimated by averaging from the neighboring values. The positions of the V2X vehicles are given in absolute coordinates, the points of the path history as relative to them. If necessary, a conversion must be made.

6. In the case of outliers, a best-fit of the trajectory and the confidence tube is performed. The outliers are not considered further.

7. The confidence tubes and trajectories are entered into the map.

8. In many cases the trajectories will not be clearly assigned to the lanes on the map. Therefore, corrections are made and the trajectories and confidence tubes are shifted in further operations using logical relationships, e.g., with the help of an ontology. The values of the corrected trajectories and confidence tubes are stored in a second table. The table with the original values is still saved so that it is available later, e.g., for control purposes or further corrections.

9. A probability for the correctness of each correction is estimated and stored, which can then be processed during association.

10. In the case of jumps in the path history caused by measurement errors of the ego-localization (e.g., GPS system), a section-by-section correction of the trajectory and the confidence tube is performed.

11. If the speed vector in the V2X messages does not take gradients/descents into account (depending on the standard) and only its amount is sent, the values in the direction of travel could be too large. The correction of such an error can be done with the help of elevation data from the map. The speed vector can then be broken down into its direction of travel and the corresponding height component.

12. When changing the pseudonym, a V2X vehicle disappears and a new one is created. A plausibility check may therefore be carried out to ensure that both transportation vehicles are identical. For example, it is very likely that the same transportation vehicle is involved if driving on at the last speed of the old pseudonym results in the position of the new pseudonym and the course of the road does not allow a new transportation vehicle to be reeved.

Hence, in some exemplary embodiments the method 10 comprises refining the estimation of the position of the second transportation vehicle based on logical considerations regarding movements or locations of one or more objects in environmental map. For example, the logical considerations comprise evaluating against a predetermined street map.

13. The following logical relationships, among others, can be used for the correction.

13.1. The correction takes into account the passable and non-passable areas shown on the map. For example, a transportation vehicle cannot drive through a building or next to a bridge. When estimating the probability of correction correctness, a distinction is made between whether the transportation vehicle position is not possible (e.g., driving through buildings) or not allowed (driving over e.g., roundabout island).

13.2. The correction also takes into account logical relationships that result from the shape of the trajectory, such as radii or distances travelled to a prominent point, such as the start of a curve.

13.3. When stopping at a traffic light followed by a turn, the position of the stop in the direction of travel can be corrected by comparing the distance travelled after starting to drive until the start of the turn (taking into account the steering angle information in the status message) with the map. This results in a probable stop position and a difference to the transmitted stop position.

13.4. The correction takes into account the applicable traffic regulations, for example, different maximum speeds on closely adjacent parallel roads. Traffic rules also serve to check plausibility and determine the probability of correction correctness.

13.5. The correction takes into account the logical relationships when moving V2X vehicles driving in groups. Groups can arise, for example, when driving together at a traffic light or on the motorway at the same speed, e.g., due to speed limits.

14. In parallel to the above operations for creating the V2X environment map, the transportation vehicle constantly detects objects in its environment using its sensors. This results in measurement inaccuracies in object detection and inaccuracies in estimating the ego pose. The position and confidence ellipse of each object are entered into an object environment table or an object environment map. For each transportation vehicle, histories of the observed distance travelled (trajectories, position-time progression) including dynamic parameters (e.g., speed) are also stored. The ego trajectory and the ego-confidence tube may also be entered. The object environment table or an object environment map are updated cyclically.

15. In a further operation, the transportation vehicles in the object environment map may now be compared with the transportation vehicles from the corresponding area of the V2X map. Because the range of V2X communication is often greater than the sensor range, the environment map usually includes only a subset of the V2X map.

16. The trajectories of the objects detected by the sensors and the trajectories of the V2X objects are compared. Statistical methods are used for this purpose. Among other things, the spatial course and the velocity profile are considered. From a threshold to be defined (e.g., correlation measure) an assignment can be made, i.e., a V2X transmitter is assigned to a detected transportation vehicle.

17. The assignment can also take into account information such as the transportation vehicle class (truck, car).

18. The assignment can also take into account the probability of trajectory correction of V2X vehicles.

19. The principle can also be transferred to stationary V2X receivers, e.g., to traffic lights, crossroads, roundabouts, motorway entrances etc. equipped with sensors.

As outlined above CPM objects may be associated into the environment model of the ego-vehicle with the help of prior knowledge. V2X message CPM (Collective Perception Message), which is currently being standardized at ETSI (European Telecommunications Standards Institute), contains the position of the sending transportation vehicle in absolute coordinates and information on objects detected by the transportation vehicle sensors relative to them. These objects are mainly other road users, especially other transportation vehicles. Information on pedestrians could also be sent as CPM objects. This topic is dealt with in various research projects and is important for increasing traffic safety, e.g., it is an important application for permanently installed roadside sensor systems at intersections. In addition, information about static objects could also be sent as CPM objects, such as construction site barriers.

The assignment of CPM or of CPM sending transportation vehicles and the CPM objects detected by them to the objects detected by the receiving transportation vehicles themselves is usually very difficult and often even impossible. The reason is that CPM-sending transportation vehicles often cannot determine their ego-pose (location and orientation) with sufficient accuracy. The information on the CPM objects they detect is correspondingly inaccurate. In addition to measurement and calibration inaccuracies of the sensors, errors in the estimation of their transportation vehicle orientation (heading) also have an effect here. Angular errors have a particularly large effect when detecting distant objects.

Disclosed embodiments might not only focus on the association of the transportation vehicles sending the V2X messages (CAM, DENM, CPM), but may also deal with the association of the CPM objects, i.e., the transportation vehicles sent in the CPM and detected by the CPM vehicles with their sensors.

In further exemplary embodiments the method 10 may comprise

Receiving CPM messages,

Store the received CPM messages, for example, in a table to create a history,

Assign the CPM sending transportation vehicle and its CPM objects on a map (V2X environment map), Improvement of the allocation to lanes and locations based on logical connections, and High-level fusion of the transportation vehicles detected by the Ego vehicle and the corresponding CPM objects from the V2X environment map.

In some exemplary embodiments it is assumed that the recipient transportation vehicle has the following minimum equipment:

V2X receiver unit, which enables reception of CPM, CAM and DENM

Digital map with sufficient accuracy, such as HD-Map

System for ego-localization

Sensor system for object detection, e.g., camera, LIDAR, radar etc.

Calculation unit for calculating an environment model and for associating V2X vehicles and CPM objects The following operations may be performed for association:

Creating a V2X environment map

1. Based on the received CPM message, the position of the sending transportation vehicle with its confidence ellipse and the transportation vehicle heading are stored in a V2X environment table. Furthermore, this table stores the CPM objects with the specification of their confidence levels specified in the CPM (e.g., in x, y and z direction with respect to the coordinate system of the CPM vehicle, hereinafter referred to as confidence distances). The order criteria for the table are sender pseudonyms and transmission time.

2. The V2X environment table is updated cyclically. It is limited to a period to be defined, e.g., to the last 30 seconds. In the sense of a ring memory, the obsolete information is replaced by new information and can be stored elsewhere if necessary.

3. The contents of the V2X environment table are entered into a digital map.

4. For the CPM-sending transportation vehicles, trajectories result for the paths they travel and confidence tubes are derived from their confidence ellipses. For the travelled paths of each CPM object, the confidence distances in x, y and z direction result in trajectories with confidence tubes. The width of the confidence tubes may fluctuate if the confidence changes during the observation period. A corresponding procedure for CAM or DENM transmitting transportation vehicles is described above.

5. In each confidence tube there is a trajectory that results from the positions sent with the CPM. The trajectories of the perceived CPM objects are composed of their individual positions. They are supplemented by confidence tubes. If individual CPM messages were not received, the missing items may be, for example, by averaging, estimated or interpolated from neighboring values. The positions of the sending V2X vehicle are specified in the CPM in absolute coordinates. The values of the CPM objects (trajectories, confidence tubes) are relative.

6. Outliers are discarded and a best-fit of the trajectory and confidence tube is performed according to the case of non-received messages.

7. In many cases the trajectories will not be clearly assigned to the lanes on the map. Therefore, in further operations, corrections are made using logical relationships, e.g., with the help of an ontology or rules, and the trajectories and confidence tubes are shifted. The values of the corrected trajectories and confidence tubes are stored in a second table. The table with the original values is still saved so that it is available later, e.g., for control purposes or further corrections.

8. A probability for the correctness of each correction is estimated and stored, which can then be processed during association.

9. In case of jumps in the position data of the transmitting transportation vehicle, caused e.g., by measurement errors of its ego-localization (e.g., possible with GPS systems), a section-by-section correction of the trajectory and the confidence tube is performed. The trajectories and confidence tubes of its CPM objects are corrected accordingly.

10. For the correction for the CPM vehicles as well as the CPM objects, the following logical relationships, among others, can be used:

10.1. The correction takes into account the passable and non-passable areas shown on the map. For example, a transportation vehicle cannot drive through a building or next to a bridge. This correction is simple and unambiguous. The CPM-sending vehicle and its CPM objects form a group that is inserted into the map as a whole by translation and rotation.

10.2. The correction also takes into account logical relationships that result from the shape of the trajectory, such as radii or distances travelled to a prominent point, such as the start of a curve.

10.3. The correction takes into account the valid traffic regulations. They are used for plausibility checks and to determine the probability of correction correctness.

10.4. The correction takes into account the logical relationships when moving CPM objects as a group.

11. When changing the pseudonym, a V2X vehicle disappears and a new one is created. A plausibility check must therefore be carried out to ensure that both transportation vehicles are identical. For example, it is very likely to be the same transportation vehicle if driving on with the same set of sensors and the same perceived objects of the old pseudonym of the new pseudonym and the course of the road does not allow a new transportation vehicle to be reevaluated.

12. CPM objects can also be CAM or DENM sending transportation vehicles, or other CPM sending transportation vehicles. It is also possible that one transportation vehicle has been identified as a CPM object by several CPM-sending vehicles. The task is therefore to resolve these ambiguities. It is suggested to use the corrected map entries for this purpose.

12.1. In a first operation, the affected V2X vehicles or CPM objects are identified. For this purpose, for example, a measure of the spatial proximity or overlap of trajectories and confidence tubes can be used.

12.2. Next, criteria are considered which allow a plausibility check that it is the same object. Suitable methods are, for example, the comparison of speed-time curves (started to decelerate at the same time) or angle-time curves for changes in transportation vehicle orientation (heading). Furthermore, information contained in V2X messages such as the transportation vehicle class (truck, car) can be taken into account. Statistical methods are used for this purpose. From a threshold to be defined (e.g., correlation measure) an assignment can be made.

12.3. Ambiguities are removed from the map. The eliminated objects can be saved in another table to allow later checks and corrections.

12.4. The objects remaining in the map are marked as multiple detected.

12.5. It is to be expected that multiple detection of individual objects will take place over a longer period of time, e.g., because this results from the flow of traffic and transportation vehicles drive virtually parallel to each other. In this case, a plausibility check can be simplified and, for example, only be carried out at intervals to be defined, i.e., as a cyclical confirmation.

12.6. When deleting duplicates, it must be assessed which object is deleted and which is retained. For this purpose, it is necessary to estimate which information is likely to be more accurate. The less accurate ones are deleted. It is also possible that during this operation, a correction of the object positions is made and only the corrected values remain in the map.

Creating an Object Environment Map

13. In parallel to the above operations for creating the V2X environment map, the transportation vehicle constantly detects objects in its environment using its sensors. This results in measurement inaccuracies in object detection and inaccuracies in ego-localization. The positions of each object are entered in an object environment table or an object environment map. For each transportation vehicle, histories of the observed distance travelled (trajectories, position-time curve) are also stored. The ego trajectory and the ego-confidence tube are also entered. The object environment table or an object environment map are updated cyclically.

Adjustment of objects from the object map and the V2X environment map

14. In a further operation, the transportation vehicles in the object environment map are now compared with the transportation vehicles from the corresponding area of the V2X environment map. Because the range of V2X communication is often greater than the sensor range, the environment map usually includes only a subset of the V2X environment map.

15. The trajectories of the objects detected by the sensors and the trajectories of the V2X objects (CAM, DENM, CPM transmission vehicles and CPM objects) are compared. Statistical methods are used for this purpose. Among other things, the spatial course and the velocity profile are considered. From a threshold to be defined (e.g., correlation measure) an assignment can be made, i.e., a V2X transmitter or a CPM object is assigned to a detected transportation vehicle.

16. The assignment can also take into account information contained in the V2X messages such as the transportation vehicle class (truck, car).

17. The assignment can also take into account the probability of trajectory correction of V2X vehicles.

Disclosed embodiments may use the above procedures complement them by using planned and desired trajectories from MCM. That means disclosed embodiments use the shared planed and desired trajectories of other transportation vehicles. Furthermore, it might be possible to predict a trajectory of transportation vehicles based on the CAM message, which however is not accurate as the shared trajectory through a MCM message.

Disclosed embodiments may use an approach for advanced positioning, which might be combined with the above as follows:

Positioning based on MCM+CAM message,
Positioning based on MCM+CPM message, and
Positioning based on MCM+CAM and CPM.

I. For example, the first transportation vehicle V1 (cf. FIG. 4) has a highly accurate HD Map.

II. It receives one or more trajectories (trajectory set/trajectory area) from other transportation vehicles, e.g., planed and desired trajectory.

III. V1 tries to fit the trajectory set from one specific node (e.g., V2) into its own map and finds therefore a reasonable position of V2. V1 also receives the dimensions 1 (transportation vehicle width, length etc.) of the V2 via the radio channel and is considering it for the fitting. For example, vehicular dimensions are shared optional within the CAM message (2D, x-y-dimension), the CPM message (3D, x-y-z-dimension), and are planned to be shared within the MCM message. In this disclosed embodiment the method 10 further comprises receiving information on the dimensions of the second transportation vehicle and estimating the position of the second transportation vehicle in the environmental map further based on the information on the dimensions of the second transportation vehicle.

IV. V1 obtains a set of possible absolute positions of the transportation vehicle in its HD map.

V. Note, that the larger the set of trajectories is, the more the possible set of absolute positions of the transmitting node (e.g., V2) can be narrowed down.

VI. In a last operation, the obtained set of absolute positions may be used and/or combined with further positioning and association methods as outlined above. Therefore, the transportation vehicle increases its capabilities to position and associate communication messages of other transportation vehicles.

Figure 5:
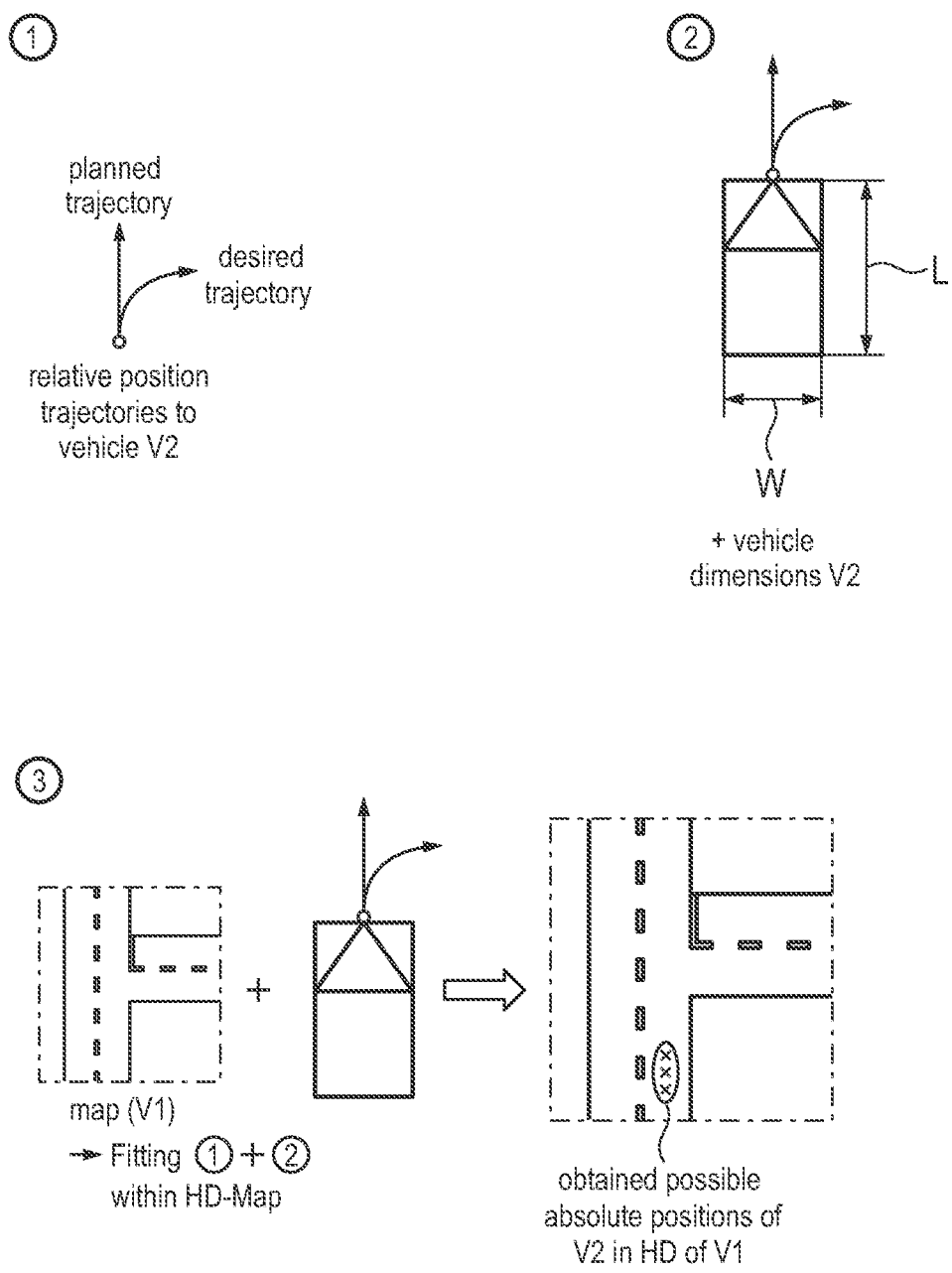
FIG. 5 illustrates an exemplary embodiment of a trajectory to map fitting in an exemplary embodiment.

FIG. 5 shows a simplified example of the trajectory HD map fitting in an exemplary embodiment. The procedure is carried out from left to right. V1 receives from V2 the relative position of the trajectories (shown on the very left in operation at 1 in FIG. 5). It also receives the transportation vehicle dimensions of V2 (operation at 2 in FIG. 2, second from the left). V1 has an accurate HD map in which it tries to fit the information obtained in operations at 1 and 2 (shown in operation at 3, third from the left). The output is an obtained possible set of absolute positions of V2 in the map of V1 (shown on the right of FIG. 5).

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for a first transportation vehicle and for estimating a position of a second transportation vehicle at the first transportation vehicle
12 obtaining information on an environmental map of the first transportation vehicle
14 receiving information on a trajectory of the second transportation vehicle
16 estimating the position of the second transportation vehicle in the environmental map based on the information on the trajectory
20 apparatus for a first transportation vehicle and for estimating a position of a second transportation vehicle at the first transportation vehicle
22 one or more interfaces
24 control module
200 transportation vehicle
V1 first transportation vehicle
V2 second transportation vehicle
V3 third transportation vehicle

The invention claimed is:

1. An apparatus for a first transportation vehicle for estimating a position of a second transportation vehicle at the first transportation vehicle, the apparatus comprising:
one or more interfaces to communicate messages; and
a control module to control the one or more interfaces, wherein the control module is further configured to control the apparatus to estimate the position of the second transportation vehicle at the first transportation vehicle by:
obtaining information on an environmental map of surroundings of the first transportation vehicle,
receiving information on a trajectory of the second transportation vehicle, wherein the trajectory information includes information on a desired trajectory of the second transportation vehicle, and estimating a current position of the second transportation vehicle in the environmental map based on fitting the received trajectory information in the environmental map.

2. A transportation vehicle comprising the apparatus of claim 1.

3. The apparatus of claim 1, wherein the received trajectory information is received by the apparatus at the first transportation vehicle from the second transportation vehicle.

4. The apparatus of claim 1, wherein the received trajectory information further comprises information on a planned route of the second transportation vehicle.

5. The apparatus of claim 1, wherein the control module further controls receiving information on the dimensions of the second transportation vehicle and estimating the position of the second transportation vehicle in the environmental map further based on the information on the dimensions of the second transportation vehicle.

6. The apparatus of claim 1, wherein the control module further controls receiving information on an estimated location of the second transportation vehicle and estimating the position of the second transportation vehicle in the environmental map further based on the information on the estimated location of the second transportation vehicle.

7. The apparatus of claim 1, wherein the control module further controls refining the estimation of the position of the second transportation vehicle based on logical considerations regarding movements or locations of one or more objects in environmental map.

8. The apparatus of claim 7, wherein the logical considerations comprise evaluating against a predetermined street map.

9. The apparatus of claim 1, wherein the estimating is further based on messages communicated with other transportation vehicles or infrastructure in the environment.

10. The apparatus of claim 1, wherein the environmental map is based on street map, objects detected using sensor data of the first transportation vehicle, and messages with environmental content received from other transportation vehicles in the environment of the first transportation vehicle.

11. The apparatus of claim 1, wherein the estimating comprises determining a confidence area for the second transportation vehicle in the environmental map.

12. The apparatus of claim 11, wherein the control module further controls refining the confidence area based on an actual road and/or traffic situation in the environment of the first transportation vehicle.

13. The apparatus of claim 12, wherein the receiving of the trajectory information of the second transportation vehicle in a collective perception message or a maneuver coordination message from the second transportation vehicle.

14. A method for a first transportation vehicle for estimating a position of a second transportation vehicle at the first transportation vehicle, the method comprising:
obtaining information on an environmental map of surroundings of the first transportation vehicle;
receiving information on a trajectory of the second transportation vehicle, wherein the information includes information on a desired trajectory of the second transportation vehicle; and
estimating a current position of the second transportation vehicle in the environmental map based on fitting the received trajectory information in the environmental map.

15. The method of claim 14, wherein the received trajectory information is received at the first transportation vehicle from the second transportation vehicle.

16. The method of claim 14, wherein the received trajectory information further comprises information on a planned route of the second transportation vehicle.

17. The method of claim 14, further comprising receiving information on the dimensions of the second transportation vehicle and estimating the position of the second transportation vehicle in the environmental map further based on the information on the dimensions of the second transportation vehicle.

18. The method of claim 14, further comprising receiving information on an estimated location of the second transportation vehicle and estimating the position of the second transportation vehicle in the environmental map further based on the information on the estimated location of the second transportation vehicle.

19. The method of claim 14, further comprising refining the estimation of the position of the second transportation vehicle based on logical considerations regarding movements or locations of one or more objects in environmental map.

20. The method of claim 14, wherein the logical considerations comprise evaluating against a predetermined street map.

21. The method of claim 14, wherein the estimating is further based on messages communicated with other transportation vehicles or infrastructure in the environment.

22. The method of claim 14, wherein the environmental map is based on a street map, objects detected using sensor data of the first transportation vehicle, and messages with environmental content received from other transportation vehicles in the environment of the first transportation vehicle.

23. The method of claim 14, wherein the estimating comprises determining a confidence area for the second transportation vehicle in the environmental map.

24. The method of claim 23, further comprising refining the confidence area based on an actual road and/or traffic situation in the environment of the first transportation vehicle.

25. The method of claim 14, wherein the receiving of the trajectory information of the second transportation vehicle in a collective perception message or a maneuver coordination message from the second transportation vehicle.

26. A non-transitory computer readable medium including a computer program having a program code for performing the method of claim 14, when the computer program is executed on a computer, a processor, or a programmable hardware component.

* * * * *